United States Patent
Adams et al.

(10) Patent No.: US 8,424,077 B2
(45) Date of Patent: Apr. 16, 2013

(54) SIMPLIFIED MANAGEMENT OF AUTHENTICATION CREDENTIALS FOR UNATTENDED APPLICATIONS

(75) Inventors: Garney David Adams, Stittsville (CA); Robert Grapes, Ottawa (CA); Yuan Xiang Gu, Ottawa (CA); Richard Edward Johnston Mehan, Ottawa (CA); Jack Jiequn Rong, Ottawa (CA)

(73) Assignee: Irdeto Canada Corporation, Kanata, ON (CA)

( * ) Notice: Subject to any disclaimer, the term of this patent is extended or adjusted under 35 U.S.C. 154(b) by 1436 days.

(21) Appl. No.: 11/640,371

(22) Filed: Dec. 18, 2006

(65) Prior Publication Data
US 2008/0148373 A1    Jun. 19, 2008

(51) Int. Cl.
*G06F 21/00* (2006.01)
(52) U.S. Cl.
USPC .......... 726/17; 726/4; 726/6; 726/8; 713/168; 380/241; 455/411; 705/67
(58) Field of Classification Search ................ 726/6, 21; 713/193
See application file for complete search history.

(56) References Cited

U.S. PATENT DOCUMENTS

| | | | |
|---|---|---|---|
| 7,249,176 B1* | 7/2007 | Salas et al. ..................... 709/225 |
| 7,480,935 B2* | 1/2009 | Bazot et al. ......................... 726/9 |
| 7,546,373 B2* | 6/2009 | Lehew et al. .................. 709/229 |
| 7,690,026 B2* | 3/2010 | Zhu et al. ............................ 726/8 |
| 7,900,044 B2* | 3/2011 | McCreight et al. ............ 713/168 |
| 7,904,948 B2* | 3/2011 | Bazot et al. ......................... 726/9 |
| 2003/0217166 A1* | 11/2003 | Dal Canto et al. ............. 709/229 |
| 2004/0010701 A1* | 1/2004 | Umebayashi et al. ........ 713/193 |
| 2004/0088545 A1* | 5/2004 | Foster et al. ................... 713/167 |
| 2004/0128538 A1* | 7/2004 | Gmuender et al. ............ 713/201 |
| 2004/0240670 A1* | 12/2004 | Man et al. ....................... 380/277 |
| 2005/0114666 A1* | 5/2005 | Sudia .............................. 713/175 |
| 2005/0246707 A1* | 11/2005 | Ismail et al. ................... 718/100 |
| 2006/0236368 A1* | 10/2006 | Raja et al. .......................... 726/1 |
| 2007/0078972 A1* | 4/2007 | Yagishita ....................... 709/224 |
| 2007/0101400 A1* | 5/2007 | Freeman et al. ................... 726/2 |
| 2008/0134305 A1* | 6/2008 | Hinton et al. ...................... 726/5 |

OTHER PUBLICATIONS

Bellavista, et al., "Context-aware middleware for resource management in the wireless Internet", Software Engineering, IEEE Transactions on Date of Publication: Dec. 2003, vol. 29, Issue: 12; pp. 1086-1099.*
"Improve Application Access Security", Processor Magazine, vol. 28, Issue 1, p. 15, Jan. 6, 2006.
Murphy, "Security Implementation Strategy: Capabilities and Challenges", Hilbert Computing Inc., Jul. 12, 2005.
Written Opinion and International Search Report from PCT/CA2007/002048 dated Mar. 4, 2008.

* cited by examiner

*Primary Examiner* — Morshed Mehedi

(57) ABSTRACT

Systems and methods for unattended authentication of software applications to provide these applications with access to shared resources. A server password manager (SPM) module resident on a node also occupied by a requester software application requesting access to resources receives the requestor's request. The SPM module creates a request package containing the requestor's information as well as the node's identifying information. The request package is then transmitted to a credentials manager (CM) module in a CM node. The request package, encrypted by the SPM module with encryption keys previously generated by the CM module, is decrypted by the CM module. The contents are checked against data stored by the CM module regarding the SPM module and the requestor application when these were registered with the CM. If the data matches, then the CM provides credentials which are used to give the requestor application access to the requested resources.

12 Claims, 3 Drawing Sheets

SIMPLIFIED MANAGEMENT OF AUTHENTICATION CREDENTIALS FOR UNATTENDED APPLICATIONS

FIELD OF THE INVENTION

The present invention relates to security systems for computer systems. More particularly, it relates to methods and systems for granting access to resources to software applications without human intervention.

BACKGROUND TO THE INVENTION

The ever rising dependency on computer systems has resulted in an attendant rise in concern regarding computer security. One well-known method for restricting access to computers and computer resources (e.g. one program or application accessing another) is that of using passwords. Hard-coded application passwords provide the de-facto methodology to permit one application (requester) to authenticate to another application or service (target) for the purpose of gaining access to the resources and/or data offered by the target.

However, hard-coding of passwords creates significant vulnerabilities to data since the hard-coded passwords remain as clear-text information that is susceptible to malicious viewing. Such passwords also require distribution to developers and have long validity periods to accommodate for their lack of change. These considerations only increase the vulnerability to security breaches.

For those organizations with password change policies, hard-coded passwords have the drawback in that they entail a recurring software maintenance issue. Also, there are significant costs associated with human redevelopment effort and there is a potential for application outages due to synchronization errors and timing.

Regardless of these drawbacks, hard-coded passwords remain in use for approximately 90% of all corporate applications. New applications are being developed and deployed that contain hard-coded passwords. Third-party (vendor) applications force corporations to accept and deploy systems containing hard-coded passwords. 70% of datacenter applications are database driven.

While User Identity Management systems offer authentication and authorization of individuals to systems, there are significant difficulties of utilizing these solutions for the purposes of unattended applications:
  they rely upon user manual interaction for authentication;
  they rely upon user manual interaction for recovery of authentication credentials;
  they do not include credential access and management capabilities for automatic use by unattended scripts and applications;
  they offer no tamper resistance;
  they offer no defense against static or dynamic analysis; and
  they assume that employees are generally to be trusted, an assumption which is demonstrably untenable due to the prevalence of insider attacks.

Another possibility for use are provisioning systems. Provisioning systems offer the ability to push operating system and software configuration updates to servers. However, there are significant difficulties of utilizing these solutions for the purposes of unattended applications:
  they do not include run-time retrieval of credentials for use by unattended scripts and applications;
  they do not include credential access and management capabilities for automatic use by unattended scripts and applications;
  they offer no tamper resistance; and
  they offer no defense against static or dynamic analysis.

Another option would be the use of Public Key Infrastructures. Public Key Infrastructures offer the components needed to create a comprehensive and elegant authentication and authorization solution. However, there are significant difficulties of utilizing these solutions for the purposes of unattended applications:
  they do not protect keying materials while in memory;
  they rely upon user interaction for access to authentication credentials;
  they do not include credential access and management capabilities for automatic use by unattended scripts and applications;
  they offer no tamper resistance;
  they offer no defense against static or dynamic analysis or tampering of the application code;
  they dramatically shift the authentication paradigm for corporations and incur larger integration and deployment efforts; and
  both the authenticator and the authenticate must be modified to make use of PKI for authentication purposes.

Another possibility would be the Kerberos authentication protocol. The Kerberos authentication protocol offers the components needed to create a comprehensive and elegant authentication and authorization solution. However, However, there are significant difficulties of utilizing these solutions for the purposes of unattended applications:
  it does not protect keying materials while in memory;
  it relies upon user interaction for access to authentication credentials;
  it relies on hard-coded passwords for authentication by unattended applications;
  it does not include credential access and management capabilities for automatic use by unattended scripts and applications;
  it offers no tamper resistance;
  it offers no defense against static or dynamic analysis or tampering of the application code;
  it dramatically shifts the authentication paradigm for corporations and incur larger integration and deployment efforts; and
  it requires that both the authenticator and the authenticatee be modified to make use of Kerberos for authentication purposes.

There is therefore a need for systems and methods which will allow for unattended authentication of applications so that these applications can access resources. Ideally, such systems and methods avoid the shortcomings of hard coded passwords while providing a similar if not higher level of security.

SUMMARY OF THE INVENTION

The present invention provides systems and methods for unattended authentication of software applications to provide these applications with access to shared resources. A server password manager (SPM) module resident on a node also occupied by a requestor software application requesting access to resources receives the requestor's request. The SPM module creates a request package containing the requestor's information as well as the node's identifying information. The request package is then transmitted to a credentials manager (CM) module in a CM node. The request package, encrypted by the SPM module with encryption keys previously generated by the CM module, is decrypted by the CM module. The contents are checked against data stored by the CM module regarding the SPM module and the requestor application when these were registered with the CM. If the data matches, then the CM provides credentials which are used to give the requestor application access to the requested resources.

In a first aspect, the present invention provides a system for providing unattended authorization to a requesting software application to access resources, the system comprising a credentials manager (CM) module in a credentials manager node for authorizing access to said resources by said requesting software application, a server password manager (SPM) module resident on a node on which said requesting software application is resident, said SPM module being for receiving a request of said requesting software application and for transmitting said request to said CM module, said SPM module uniquely identifying itself to said CM module, wherein said SPM module and said requesting software application are previously authenticated by and registered with said CM module.

In another aspect, the present invention provides a method for requesting authorization for access to resources for a requesting software application, the method comprising receiving a request for access to resources from said requesting software application, creating fingerprint data for uniquely identifying a source of said requesting software application, said fingerprint data being derived from characteristics of a requesting node on which said requesting software application is resident, said fingerprint data being for uniquely identifying said source to a credentials manager (CM) module resident on a credentials manager node, creating a request package for transmission to said CM module, said request package containing data to uniquely identify said requesting software application to said CM module, encrypting said request package using cryptographic keys previously generated by said CM module, said cryptographic keys being specifically for communications between said CM module and said source and transmitting said request package to said CM module, wherein said requesting software application is previously registered and authenticated by said CM module and said resources are previously registered with said CM module.

In yet another aspect, the present invention provides a method for providing access to resources by a requesting software application, the method comprising the steps of receiving an encrypted request package and fingerprint data from a server password manager (SPM) module resident on a node on which said requesting software application is also resident, identifying and authenticating said node by way of said fingerprint data, determining decryption keys for use in decrypting said request package based on an identity of said node, decrypting said request package using said decryption keys, determining if contents of said request package matches stored data stored by a credentials manager module for said node and said requesting software application and in the event said contents match said stored data, transmitting credentials required to provide access to said resources for said requesting software application.

BRIEF DESCRIPTION OF THE DRAWINGS

A better understanding of the invention will be obtained by considering the detailed description below, with reference to the following drawings in which.

DETAILED DESCRIPTION

Figure 1:
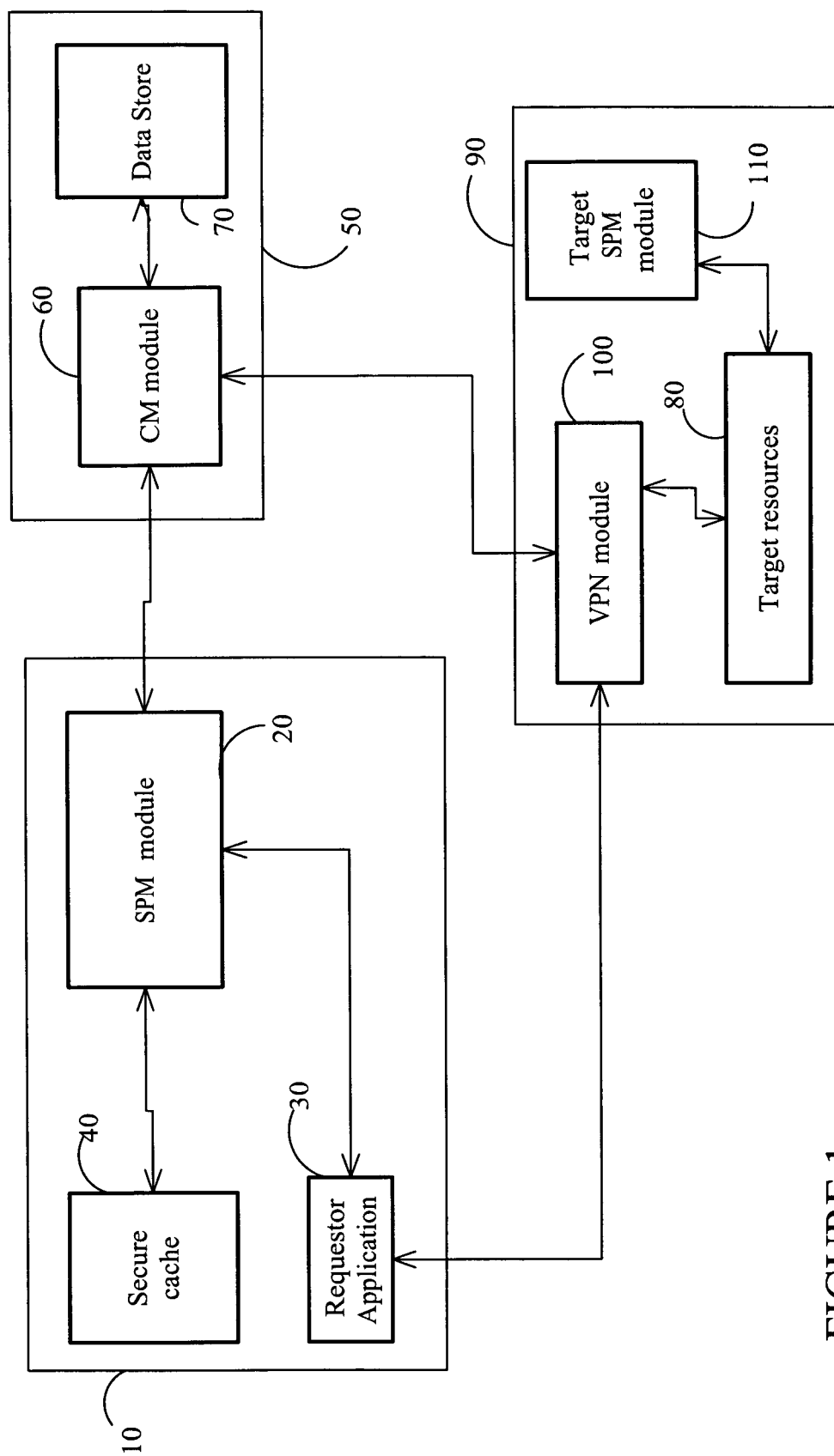
FIG. 1 is a block diagram of a system according to one aspect of the invention.

Referring to FIG. 1, a system 5 according to one aspect of the invention is illustrated. A requestor node 10 has resident on it a server password manager (SPM) module 20, a requestor application 30 and, optionally, a secure cache module 40. The requestor node 10 communicates with a credentials manager (CM) node 50. The CM node 50 has resident on it a CM module 60 and a data store module 70. The requestor node 10 communicates with the CM node 50 to request access to resources 80 on target node 90. A VPN (virtual private networking) module 100 may optionally be resident on the target node 90 to govern communications with either or both the CM node 50 and the requestor node 10.

The requestor node 10, the CM node 50, and the target node 90 are all nodes in a computer network and may be single machine servers or a collection of interconnected servers. The various modules in FIG. 1 are software modules which interact with the hardware of the nodes to execute their instructions.

The CM node 50 operates with the CM module 60 controlling the data store 70 which stores the credentials required to access the resources 80. The requestor application 30, when it needs access to the resources 80, must request these credentials to gain access to the resources. The requestor application's request is communicated to the SPM module 20 residing on the same node as the requestor application 30. The SPM module 20 receives the request, extracts the relevant information from the request, and packages that information into a request package for transmission to the CM module. The SPM module 20 encrypts the request package using encryption keys generated by the CM module 60 and previously communicated to the SPM module 20. The SPM module 20 also transmits, with the encrypted request package, fingerprint data related to the requestor node 10.

To communicate the credentials to the target resources 80, the CM module 60 may send these credentials directly to the target resources 80 along with an identification of the requestor application 30 which is to be granted access. Alternatively, the CM module 60 may return the credentials to the SPM module 20 so that the requestor application 30 may directly use these credentials to access the target resources 80. The CM module 60 may also communicate with the target resources 80 and its associated SPM module 110 for updates regarding changed credentials such as passwords and encryption keys.

It should be noted that the SPM module 20 in the requestor node 10 may use the secure cache 40 to store credentials for the requestor application 30 so that future accesses to the target resources need not go through the CM module 60. Similarly, encryption keys generated by the CM module 60 and used by the SPM module 20 to encrypt/decrypt communications with the CM module 60 may also be stored in the secure cache 40.

As can be inferred from the above description, each SPM module 20, 110 must, before being able to execute the process outlined above, identify itself to the CM module 60 and receive unique encryption keys for use in communicating with the CM module 60. As part of this setup stage, each SPM module 20, 110 gathers data about its node 10, 90 including what resources may be target resources, what applications may be requestor applications, and the details regarding these resources and applications. The SPM module 20, 110 also gathers configuration information for its node such as the hardware installed on the node and other configuration information that would uniquely identify that node. This configuration information (which may include serial numbers, applications installed on the node, version numbers of both software and hardware installed) may then be used as a "fingerprint" of that node. The fingerprint data may collected on one node can then be sent, along with the other information on that specific node, to the CM node 50 for validation. Once validated, a requestor node, and the SPM module resident on it, can request access to resources registered with the CM module 60. Of course, only the requestor applications resident on nodes registered with the CM module 60 may request access to the target resources. New applications on a node must register and be validated by the CM module 60 prior to being able to request access to the target resources.

It should be noted that, to gain access to the credentials needed to access resources, each SPM module must reconstitute its node's fingerprint data every time a requestor application resident on its node asks for access. As mentioned above, this fingerprint data is transmitted to the CM module 60 along with the relevant information relating to the target resource access request by the requester application. When the CM module 60 receives such fingerprint data, the CM module 60 can retrieve the registration data for that particular node from the data store 70 to check if the fingerprint data received from the requester node matches the fingerprint data received when the requestor node was first validated. If there is a match, then the SPM module is what it purports to be and further checking may proceed. If there is no match, then the resource access request is denied. Denial of such a request means that the requestor node must undergo the initial registration/validation process.

It should further be noted that, once a requestor node (through an SPM module resident on it) or an SPM module (if there is more than one SPM module per requestor node) is validated by the CM module 60, the CM module generates cryptographic keys which are to be used in communications between the CM module 60 and the SPM module or requestor node. These cryptographic keys are, once a copy has been sent to the relevant SPM module/requestor node, kept in the data store 70 for use by the CM module. It should be clear that a requestor node may have more than one SPM module resident on it, with each SPM module being tasked with managing target resource access for at least one requestor application on the requestor node. For such a configuration, each SPM module may have its own set of cryptographic keys for use in communicating with the CM module. For greater security one may have a configuration in which each requestor application has its own encryption keys shared with the CM module for use when communicating between the two.

Each requestor application, along with its associated SPM module and the node it is resident on, is registered and validated with the CM module. To gain access to the target resources, the requestor application asks for such access and transmits data that it originally transmitted to the CM module when it sought validation and registration. Such data may include its application name, its application file storage location, its application execution path, its application identification (ID), its application one-way hash value, its session authorization key, and the machine fingerprint of the node it is resident on. Of course, depending on the configuration of the system, any subset of the above, with or without extra data, may also be used to gain access to the resources.

To preserve the security of the system, it is preferred that each SPM module's registration be executed using human intervention. Thus, a system administrator may validate each SPM module's request for registration or validation through the CM module. Once validated, each SPM module can request and receive credentials without human intervention or interaction. Once registered, the SPM module and its requestor applications and resources (which may also be validated by way of human intervention) can access and be accessed by the system.

Regarding the data store 70 in the CM node 50, the data store may be in the form of a database. Critical values may be encrypted using a strong cipher for storage in a database field in the database. Critical encrypted data may be written into a private database using a long, strong password, the private database being part of the database. This private database may then be protected using a password that is encrypted using a managed symmetric key. The managed key may then be placed in a public database table to allow the key to be changed in an ad hoc or scheduled manner.

To simplify the record keeping duties of the CM module, the concept of aliases may be used. Each target resource (e.g. an application on a target server) may be associated with a specific alias. Also associated with the alias are the target resource's credentials (e.g. account and password). A potential requestor application which may request access to the target resource, when registered/validated, is then mapped to the alias along with that requestor application's access rights and any run-time criteria required for the release of credentials for access to the target resource. This injects a level of indirection for retrieving credentials—it allows credentials to change without any impact on the requestor application. Requestor applications, therefore, need not be individually notified if credentials required to access a specific resource are changed.

As noted above, the SPM module 20 may use the secure cache 40 so that previously accessed resources may be accessed by other requestor applications on the same node. This will allow faster access to resources for requestor applications. To use the secure cache 40, credentials received from the CM module 60 may be saved in the secure cache 40. Should a requestor application 30 on the same node as the SPM module 20 request access to resources for which credentials have been stored in the secure cache 40, the SPM module 20 can authenticate the requestor application locally and provide the necessary credentials. Of course, for security reasons, the contents of the secure cache may be encrypted and the contents may be time limited in that the contents may be automatically deleted after a predetermined amount of time. Such a scheme ensures that credentials need to be accessed periodically such that stale credentials are never stored indefinitely.

To ensure that the credentials (e.g. passwords and encryption keys) used to access the resources are up to date, the CM module may change the credentials for these resources. The CM module 60 can communicate with the resources (e.g. a software application) to change the credentials required to access the resources. Once the credentials have been changed, the new credentials are communicated to the CM module 60. The CM module 60 then updates the relevant records in the data store 70.

The methods executed by the system may be divided into two groups—those executed by the SPM module and those executed by the CM module. The process executed by the SPM module when requesting access to resources on behalf of the requestor applications is illustrated in the flowchart of FIG. 2.

Figure 2:
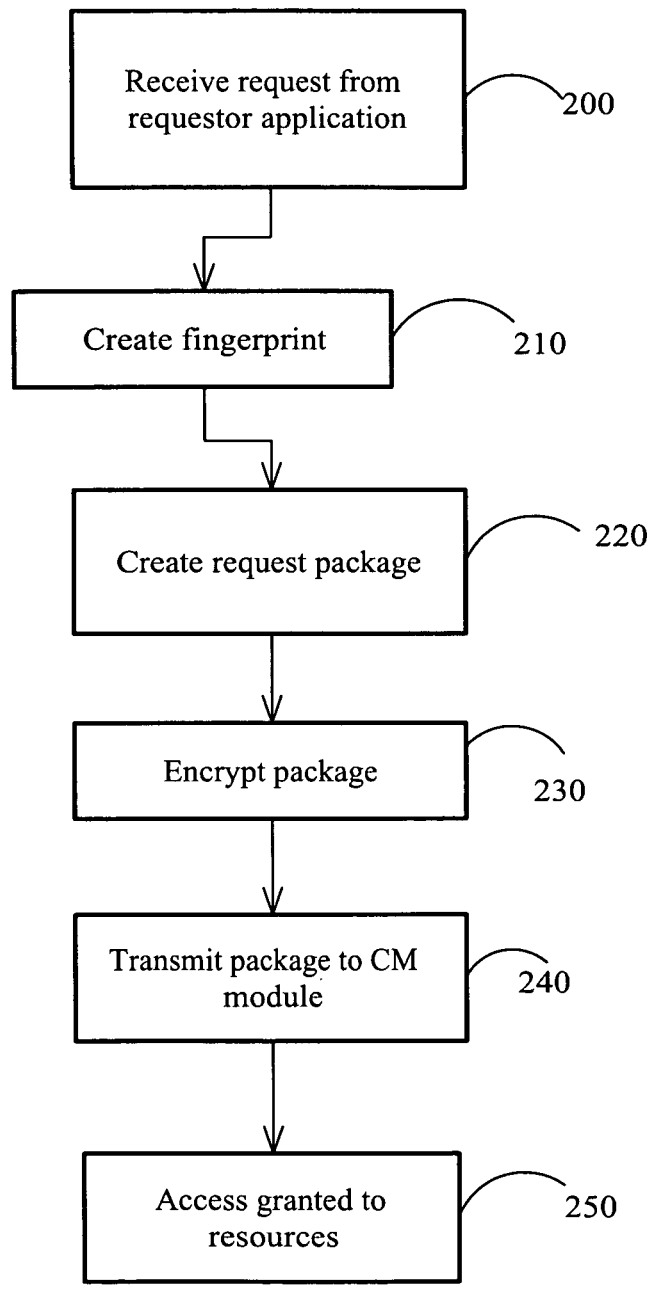
FIG. 2 is a flowchart detailing the steps in a process according to another aspect of the invention.

Referring to FIG. 2, the process starts with the SPM module receiving a request for access to resources from a requester application (step 200). The request contains information regarding the requestor application such as those mentioned above as well as information regarding which resources are to be accessed. Once the request has been received, the SPM module then creates a fingerprint for the node it occupies (step 210). This fingerprint will uniquely identify the node to the CM module. If there is more than one SPM module per node, then the fingerprint created will uniquely identify the SPM module to the CM module.

In step 220, the SPM module creates a request package for transmission to the CM module. The request package will contain the information regarding the request. This information uniquely identifies not just the requestor application but also the requested resource. This request package is encrypted in step 230 using the encryption keys uniquely shared between the SPM module and the CM module.

With the request package created, the package can be sent to the CM module (step 240). If the request is granted, i.e. the requestor application is validated and registered as being allowed access to the resources, access is granted to the resources (step 250). This may be done by either having the SPM module receive the relevant credentials from the CM module or by having the CM module directly send the credentials to the resources.

The above process assumes that the secure cache is either not being used by the SPM module or that the required credentials are unavailable from the secure cache.

Figure 3:
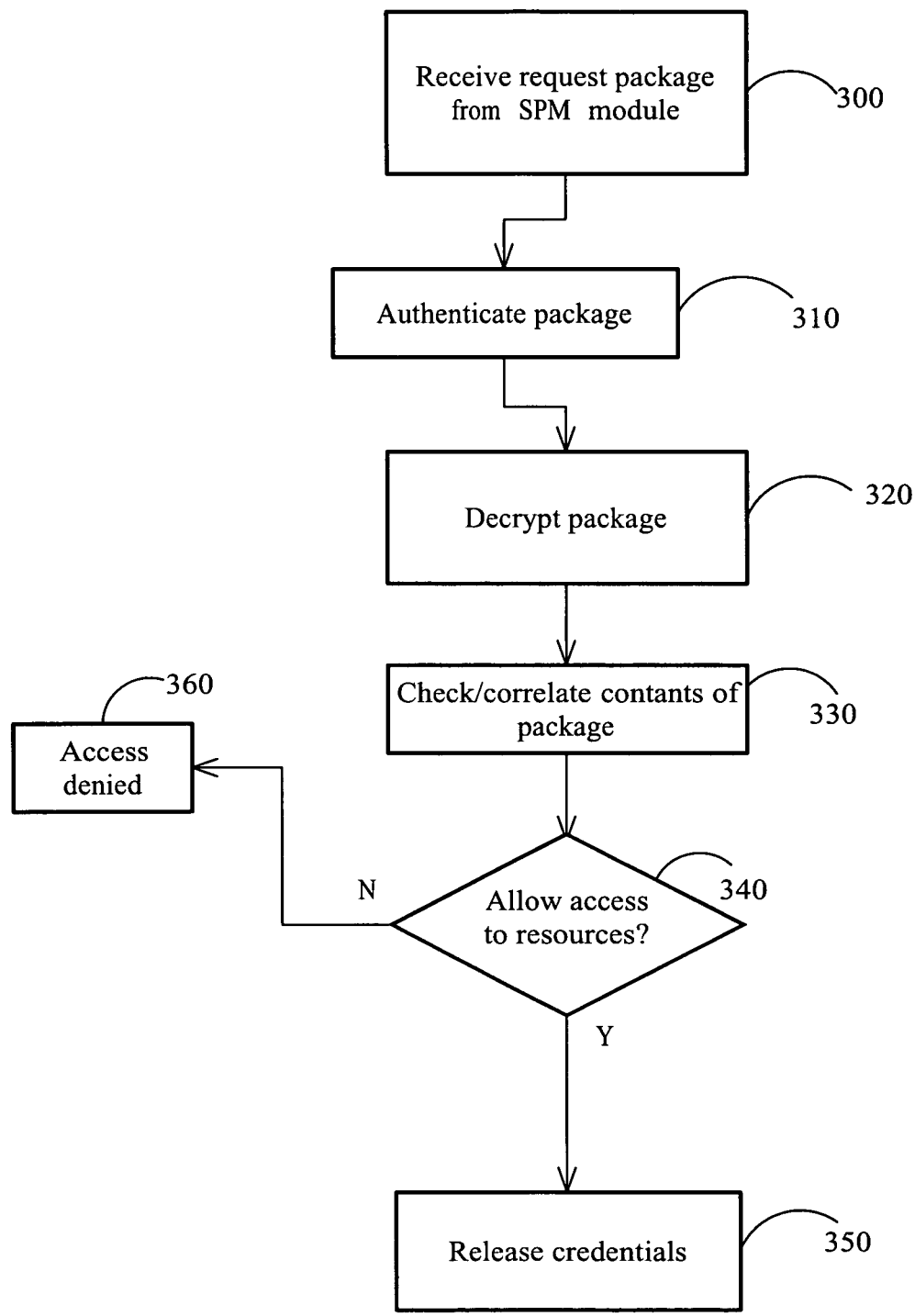
FIG. 3 is a flowchart of another process according to another aspect of the invention.

Referring to FIG. 3, a flowchart detailing the steps executed in a process by the CM module is illustrated. The process illustrated in FIG. 3 is complementary to the process in FIG. 2.

The process in FIG. 3 begins with the CM module receiving the request package from the SPM module. As part of the package, and not necessarily inside the package, the CM module receives fingerprint data to uniquely identify the SPM module to the CM module. Once the CM module receives the fingerprint data, the CM module, by checking the data store, can determine which cryptographic keys to use in decrypting the package. As noted above, the data store correlates the fingerprint data with the cryptographic keys shared with the CM module and the SPM module.

With the fingerprint data received and authenticated (step 310), the package can be decrypted (step 320). The contents of the package, the information relating to the request for credentials, are then cross-checked and correlated with the relevant data in the data store (step 330).

Decision 340 determines if the information in the package matches the data in the data store. If a match is found, then the request for access is legitimate. Furthermore, if the data in the data store indicates that the requestor application is entitled to access to the resources, then the relevant credentials are sent to the resource (step 350). This may be done by sending credentials directly to the resource. Of course, if the data in the data store indicates that the requestor application is not legitimate or that the requestor application is not entitled to access to the resources, then access is denied (step 360).

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A system for providing unattended authorization to a requesting software application to access resources, the system comprising:

a credentials manager node including a memory and a processor, the credentials manager node executing a credentials manager (CM) module for authorizing access to said resources by said requesting software application and for providing credentials for access to said resources by said requesting software application;

a requestor node on which said requesting software application is resident, said requestor node including a memory and a processor and executing a server password manager (SPM) module resident thereon, said SPM module being configured to:

receive a request for access to said resources from said requesting software application;

determine fingerprint data uniquely identifying said requestor node, said fingerprint data being derived from configuration information of said requestor node, said fingerprint data being for uniquely identifying said requestor node to said CM module;

create a request package for transmission to said CM module, said request package containing said request and data uniquely identifying said requesting software application to said CM module;

encrypt said request package using cryptographic keys previously generated by said CM module, said cryptographic keys being specifically for communications between said CM module and said requestor node; and transmit said request package and said fingerprint data to said CM module, said fingerprint data authenticating said requestor node and thereby authenticating said request package prior to decryption by said CM module;

wherein said SPM module and said requesting software application are previously authenticated by and registered with said CM module.

2. The system according to claim 1 wherein said request is encrypted using unique cryptographic keys generated by said CM module, said cryptographic keys being transmitted to and stored by said SPM module when said SPM module is authenticated by said CM module.

3. The system according to claim 1 wherein said CM module provides access to said resources to said requesting software application by transmitting credentials to said SPM agent if the data uniquely identifying said requesting software application and said request matches data stored by said CM module for said requesting software application and for said resources.

4. The system according to claim 1 wherein said CM module provides access to said resources to said requesting software application by communicating with said resources and providing credentials directly to said resources if the data uniquely identifying said requesting software application and said request matches data stored by said CM module for said requesting software application and for said resources.

5. The system according to claim 1 wherein said resources comprise another software application.

6. A non-transitory computer-readable medium storing code and instructions which, when executed by one or more processors, cause the one or more processors to perform a method for requesting authorization for access to resources for a requesting software application, the method comprising:

a) receiving a request for access to resources from said requesting software application, said requesting software application being resident on a requestor node;

b) determining fingerprint data uniquely identifying said requestor node, said fingerprint data being derived from configuration information of said requestor node, said fingerprint data being for uniquely identifying said requestor node to a credentials manager (CM) module resident on a credentials manager node;

c) creating a request package for transmission to said CM module, said request package containing said request and data uniquely identifying said requesting software application to said CM module;

d) encrypting said request package using cryptographic keys previously generated by said CM module, said cryptographic keys being specifically for communications between said CM module and said requestor node; and e) transmitting said request package and said fingerprint data to said CM module, said fingerprint data authenticating said requestor node and thereby authenticating said request package prior to decryption by said CM module, wherein said requesting software application and said requestor node are previously registered and authenticated by said CM module; and said resources are previously registered with said CM module.

7. The non-transitory computer-readable medium according to claim 6, wherein the method further includes a step of receiving credentials from said CM module in the event said data uniquely identifying said requesting software application in said request package matches data stored by said CM module in said CM node, said credentials being for transmission to said resources to obtain access for said requesting software application.

8. The non-transitory computer-readable medium according to claim 6, wherein the method further includes a step of transmitting credentials from said CM module to said resources in the event said data uniquely identifying said requesting software application contained in said request package matches data stored by said CM module, said credentials being for providing access to said resources for said requesting software application.

9. The non-transitory computer-readable medium according to claim 6 wherein said resources comprise another software application.

10. A non-transitory computer-readable medium storing code and instructions which, when executed by one or more processors, cause the one or more processors to perform a method for providing access to resources by a requesting software application, the method comprising the steps of:

a) receiving, at a credentials manager (CM) module, an encrypted request package and fingerprint data from a server password manager (SPM) module resident on a requestor node on which said requesting software application is also resident, said encrypted request package containing a request for the resources and data uniquely identifying said requesting software application, and said fingerprint data being derived from configuration information of said requestor node;

b) identifying and authenticating said requestor node by way of said fingerprint data;

c) if the requestor node is authenticated, determining decryption keys for use in decrypting said request package based on an identity of said requestor node;

d) decrypting said request package using said decryption keys to retrieve the request for the resources and the data uniquely identifying said requesting software application;

e) determining if the data uniquely identifying said requesting software application matches stored data stored by the CM module; and f) if the data uniquely identifying said requesting software application matches said stored data, transmitting credentials required to provide access to said resources for said requesting software application;

wherein said SPM module and said requesting software application are previously authenticated by and registered with said CM module.

11. The non-transitory computer-readable medium according to claim 10 wherein step f) comprises transmitting said credentials and said request to said resources.

12. The non-transitory computer-readable medium according to claim 10 wherein step f) comprises transmitting said credentials to said node.

* * * * *